(12) United States Patent
Butterfield, IV et al.

(10) Patent No.: US 11,441,709 B2
(45) Date of Patent: Sep. 13, 2022

(54) STABILIZING RESTRAINT FOR CATALYST LOADING TUBES

(71) Applicant: Chevron U.S.A. Inc., San Ramon, CA (US)

(72) Inventors: Albert E. Butterfield, IV, Novato, CA (US); Christopher Robert Oliver, Grand Bay, AL (US); Anthony Colgan Mullek, Mobile, AL (US); Gregory Alexander Mullek, Mobile, AL (US)

(73) Assignee: CHEVRON U.S.A. INC., San Ramon, CA (US)

( * ) Notice: Subject to any disclaimer, the term of this patent is extended or adjusted under 35 U.S.C. 154(b) by 26 days.

(21) Appl. No.: 17/153,435

(22) Filed: Jan. 20, 2021

(65) Prior Publication Data
US 2022/0228682 A1 Jul. 21, 2022

(51) Int. Cl.
*F16L 23/036* (2006.01)
*F16L 17/04* (2006.01)

(52) U.S. Cl.
CPC ............. *F16L 23/036* (2013.01); *F16L 17/04* (2013.01)

(58) Field of Classification Search
CPC ....... F16L 23/024; F16L 23/02; F16L 23/003; F16L 23/006; F16L 23/036; F16L 17/04
USPC .... 285/23, 27, 114, 368, 363, 364, 365, 411
See application file for complete search history.

(56) References Cited

U.S. PATENT DOCUMENTS

2011/0121567 A1* 5/2011 Gentile, Jr. ........... F16L 23/032
285/368

\* cited by examiner

*Primary Examiner* — Aaron M Dunwoody
(74) *Attorney, Agent, or Firm* — King & Spalding LLP

(57) ABSTRACT

A restraint system configured to stabilize catalyst loading tubes. The restraint system includes a first restraint that has a first collar portion and a second collar portion. The restraint system further includes a first fastener configured to attach the first collar portion to a first tube segment and a second fastener configured to attach the second collar portion to the first tube segment. The restraint system also includes a first linkage having a first end and a second end, and a second linkage having a first end and a second end. The restraint system includes a second restraint having a third collar portion and a fourth collar portion. The restraint system further includes a third fastener and a fourth fastener. The first ends of the first and second linkage couple to the first restraint and the second ends of the first and second linkage couple to the second restraint.

18 Claims, 8 Drawing Sheets

STABILIZING RESTRAINT FOR CATALYST LOADING TUBES

TECHNICAL FIELD

The present disclosure relates generally to a restraint system that stabilizes catalyst loading tubes transferring catalysts to reactor vessels.

BACKGROUND

The petroleum refining industry has been employing a wide variety of catalysts to convert crude oil into refined products for many decades. For example, Fluidized-bed Catalytic Cracking (FCC) catalysts are used to improve the yield of higher octane gasoline from crude oil. Hydrotreating and hydrocracking catalysts are applied to improve fuels quality by saturating olefins and removing the impurities in petroleum feedstocks. In addition, catalysts are loaded into reactor vessels for petroleum conversion processes including catalytic cracking, reforming, and sweetening to convert heavy oils into lighter products.

In a refinery, the catalysts are transferred from a hopper that is located close to or above the reactor vessel into a catalyst bed therein through loading tubes. Multiple short tube segments are usually connected together to provide a longer path for the catalyst to pass through. During the catalyst loading operation, it is found that the connections between tube segments can be fragile and the tube segments may fail under heavy catalyst loading if designed or installed improperly.

Thus, a restraint system for stabilizing and securing the connections between catalyst loading tube segments may be desirable to maintain the integrity of the equipment. Specifically, the restraint system may be required to work independently of existing couplings used to join catalyst loading tube segments in the refinery.

SUMMARY

The present disclosure relates generally to stabilizing catalyst loading tubes by using a restraint system. In an example embodiment, a restraint system includes a first restraint that has a first collar portion and a second collar portion. The restraint system also includes a first fastener and a second fastener. The first fastener is configured to attach the first collar portion to a first tube segment and the second fastener is configured to attach the second collar portion to the first tube segment. Further, the restraint system includes a first linkage having a first end and a second end, and a second linkage having a first end and a second end. The first end of the first linkage couples to the first restraint and the first end of the second linkage couples to the first restraint. In addition, the restraint system includes a second restraint that has a third collar portion and a fourth collar portion. The restraint system also includes a third fastener and a fourth fastener. The third fastener is configured to attach the third collar portion to a second tube segment and the fourth fastener is configured to attach the fourth collar portion to the second tube segment. Moreover, the second end of the first linkage and the second end of the second linkage couple to the second restraint.

In another example embodiment, a method includes attaching a first restraint having at least one first collar portion to a first tube segment by first and second fasteners, respectively, and attaching a second restraint having at least one second collar portion to a second tube segment by third and fourth fasteners, respectively. The method also includes joint coupling the first tube segment and the second tube segment and aligning the first restraint and the second restraint. Further, the method includes coupling a first end of a first linkage and a first end of a second linkage to the first restraint. The method also includes coupling a second end of the first linkage and a second end of the second linkage to the second restraint.

In yet another example embodiment is directed to a restraint system for coupling first and second tube segments. The restraint system includes a first restraint having at least one first collar portion and a first fastener configured to attach the at least one first collar portion to the first tube segment. The restraint system also includes a second restraint having at least one second collar portion and a second fastener configured to attach the at least one second collar portion to the second tube segment. A first linkage has a first end that couples to the first restraint and a second end that couples to the second restraint. A second linkage has a first end that couples to the first restraint and a second end that couples to the second restraint.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

Figure 1:
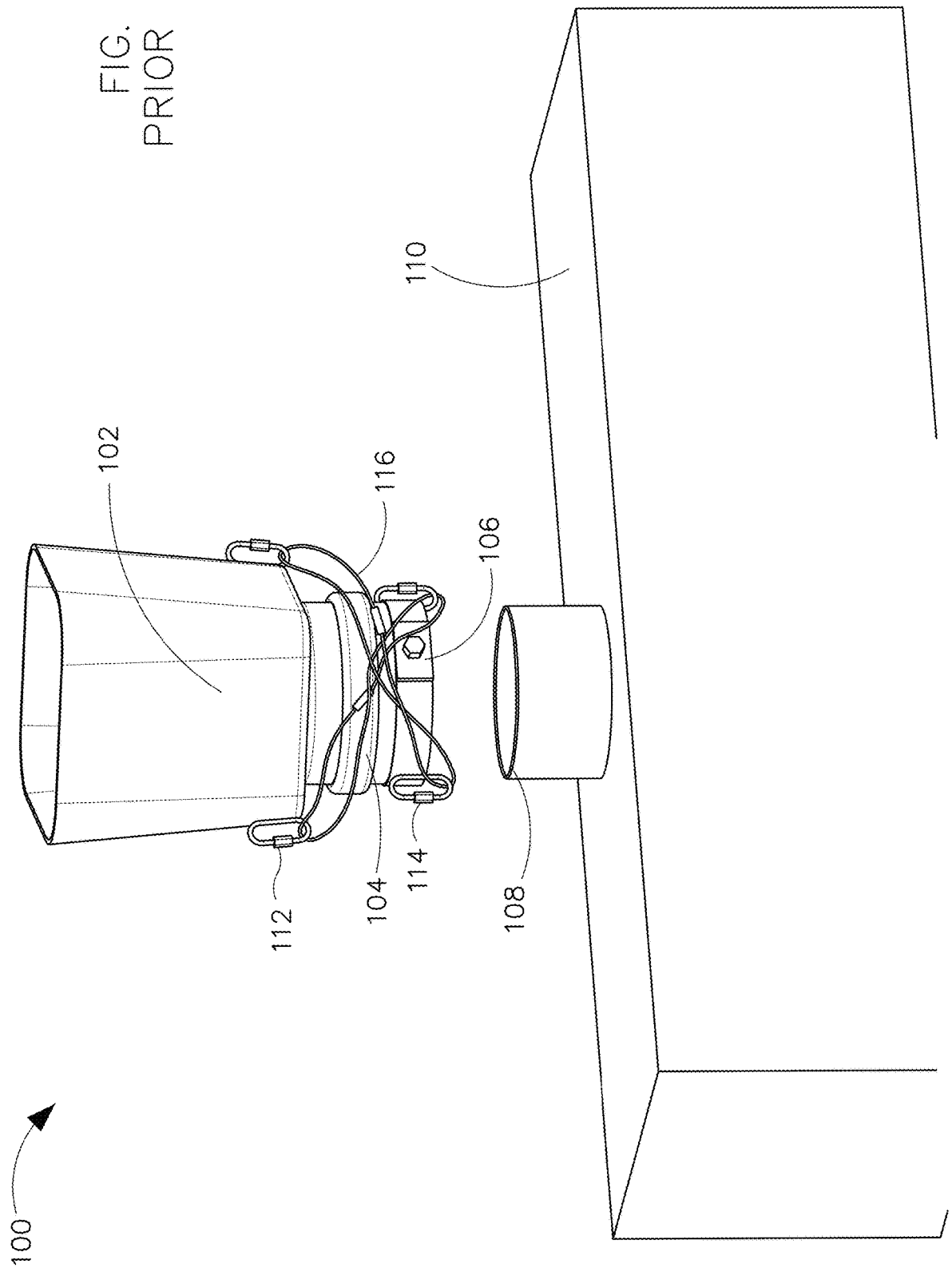
FIG. 1 shows a damaged primary restraint of a restraint system for a connection of catalyst loading tube segments according to the prior art.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Turning now to the drawings, FIG. 1 shows a restraint system 100 for a connection between catalyst loading tube segments according to the prior art. The restraint system 100 is configured for securing the loading of catalyst from a hopper into a reactor vessel through the tube segments. The catalyst loading tube segments connection in FIG. 1 includes a hopper outlet 102, a hopper to load tube clamp 104, a catalyst loading tube 108, and a reactor vessel 110. The hopper outlet 102 can be generally considered as another tube segment when this disclosure refers to joining loading tube segments. The reactor vessel 110 is located on the ground and has a catalyst loading tube extending through the top of the reactor vessel 110. The catalyst is prescreened in a hopper located above the reactor vessel and is output through the hopper outlet 102. As shown in FIG. 1, a coupling to tube joint 106 is utilized to connect the hopper outlet 102 with the catalyst loading tube 108 at the top of reactor vessel 110. The coupling to tube joint 106 has two ends with sizes fitting to the hopper outlet 102 and the catalyst loading tube 108, respectively. An upper end of the coupling to tube joint 106 is connected with the hopper outlet 102 and secured by a hopper to load tube clamp 104 as part of the primary restraint of restraint system 100. On the lower end of the coupling to tube joint 106, bolts are used to improperly lock the coupling to tube joint 106 with the catalyst loading tube 108, however, as illustrated in FIG. 1 the connection of the coupling to tube joint 106 and the catalyst loading tube 108 is damaged and failed to maintain the connection. In this example, a metal rope 116, as the secondary restraint of the restraint system 100 shown in FIG. 1, is configured to protect the connection between the hopper outlet 102 and the coupling to tube joint 106. However, the metal rope 116 does not protect against failure of the connection between the catalyst loading tube 108 and the coupling to tube joint 106.

In this prior art approach shown in FIG. 1, the connection between the hopper outlet 102 and the coupling to tube joint 106 is secured by locks respectively attached on the hopper outlet 102 and the coupling to tube joint 106. As shown in FIG. 1, there are two upper locks 112 attached on the outside wall of the hopper outlet 102 and another two lower locks 114 attached on the coupling to tube joint 106. Further, a metal rope 116 is wired through the upper and lower locks as part of the secondary restraint to secure the connection between the hopper outlet 102 and the coupling to tube joint 106. To uniformly orient and distribute catalyst within the reactor vessel 110, catalyst is loaded from a catalyst hopper into the reactor vessel 110 using a mechanical spreading device attached to the bottom end of the catalyst loading tube. Alternatively, a flexible catalyst loading tube segment can be attached to the end of the catalyst loading tube 108 within the reactor vessel 110 and an operator can move the flexible catalyst loading tube segment within the reactor vessel 110 to uniformly distribute the catalysts within the reactor vessel and to reduce inconsistencies and voids.

Figure 2:
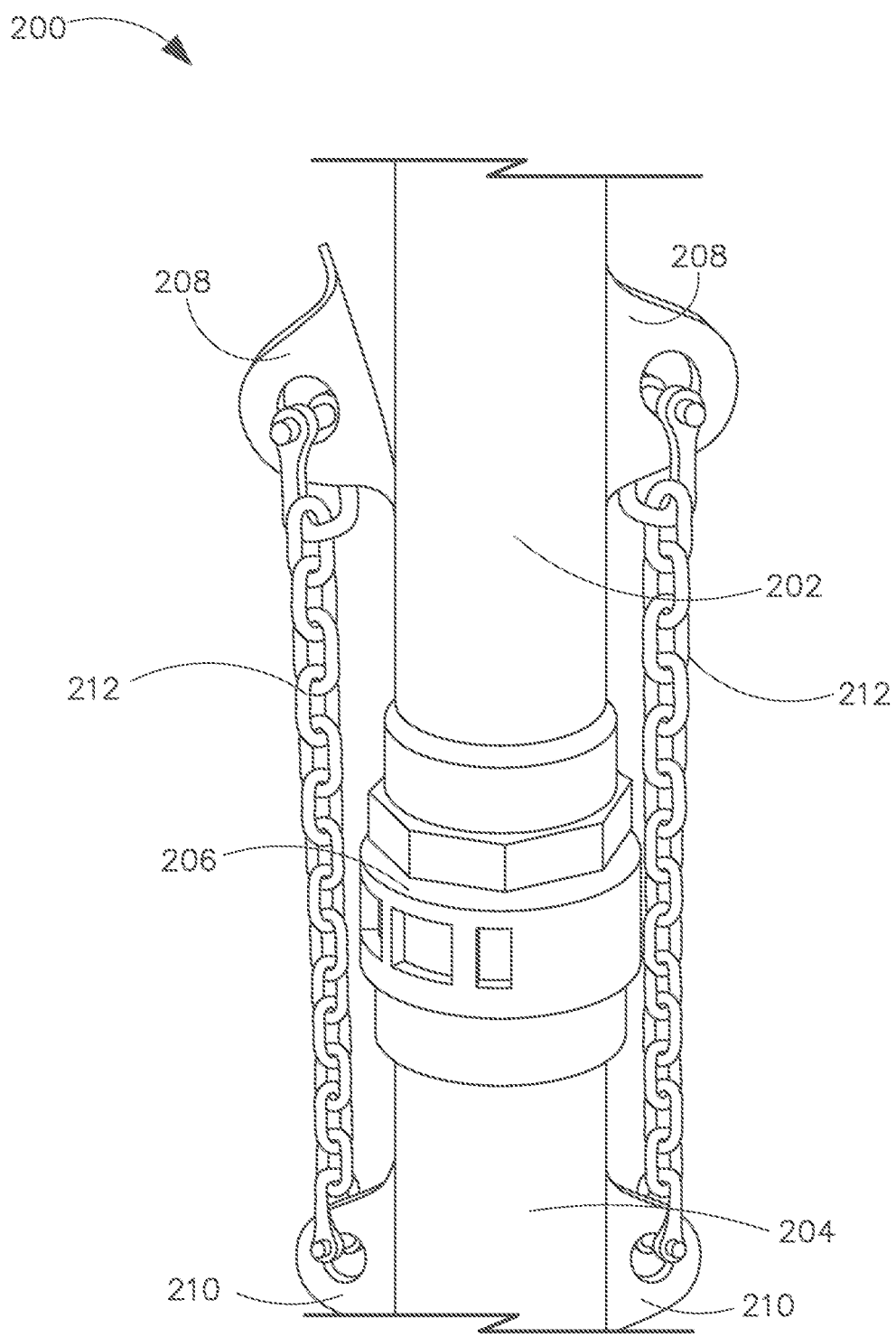
FIG. 2 shows a damaged secondary restraint of a restraint system for a connection of catalyst loading tube segments according to the prior art.

FIG. 2 shows another example of a restraint system 200 for connecting catalyst loading tube segments according to the prior art. Similar to the primary restraint shown in FIG. 1, this prior art restraint system example 200 includes a joint coupling 206 that connects the tube segments 202 and 204. Additionally, there are two upper flanges 208 and two lower flanges 210 in this restraint system 200 that are respectively welded onto the tube segments 202 and 204. In this example, chains 212 are used to secure, as the secondary restraint of the example 200, the connection of the tube segments 202 and 204 by correspondingly connecting each one of the upper flanges 208 to each one of the lower flanges 210.

FIG. 2 shows that this restraint system 200 has failed in securing the connection of the tube segments 202 and 204 for catalyst loading. In fact, as shown on FIG. 2, one of the upper flanges 208 was stripped off from the tube segment 202 and left a hole on the sidewall of the tube segment 202. This failure can occur when there is a large loading of the catalyst through the tube segment connection. Specifically, the catalyst loading causes a large vertical force along the longitudinal axis of the tube segments at the connection of the tube segments and, as shown in FIG. 2, the welds at the point where the flanges attach to the tube segments cannot withstand this force. In some other examples, the chains may be broken due to the large vertical force that is applied thereon.

Figure 3:
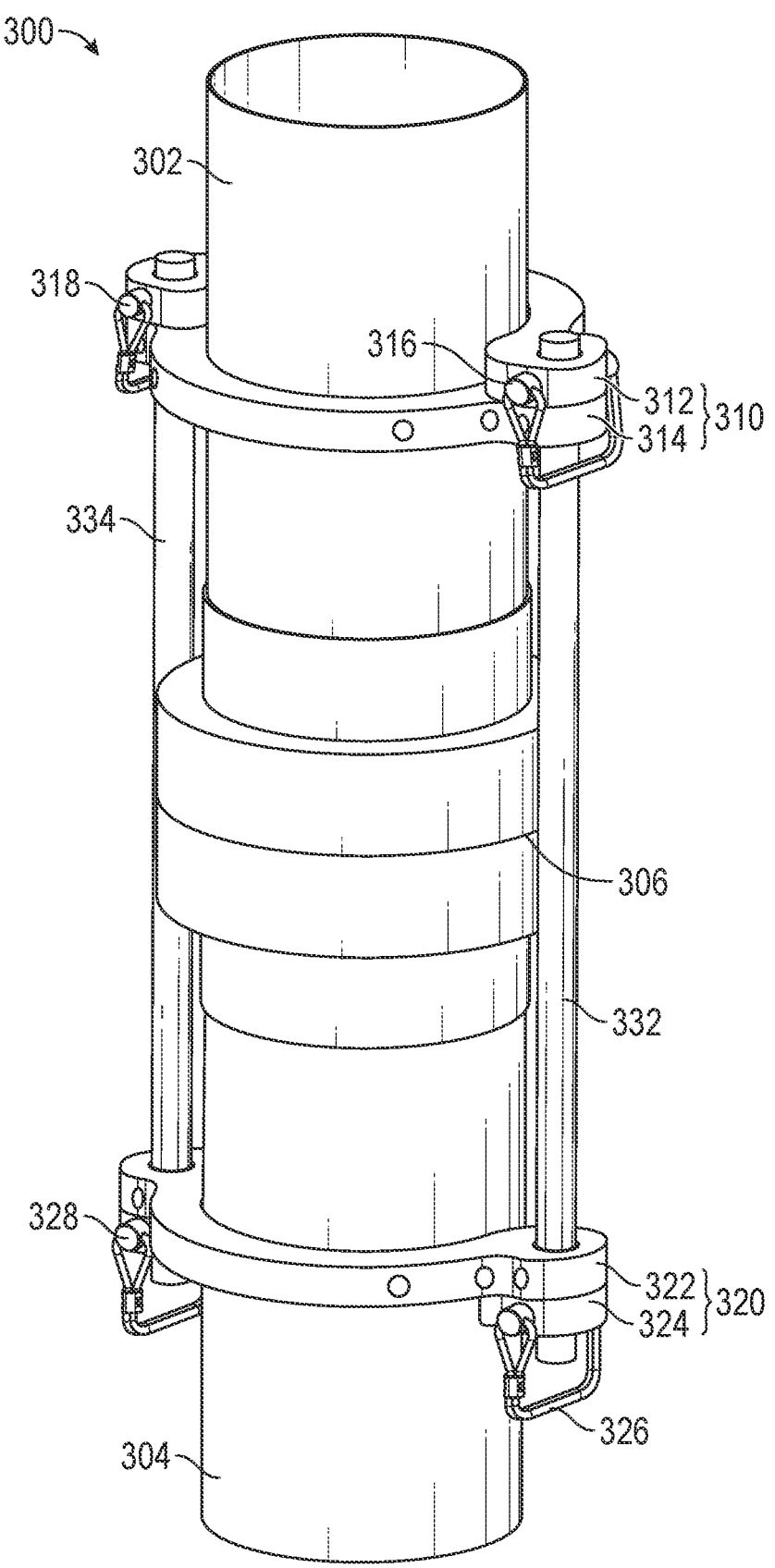
FIG. 3 is a perspective view of a restraint system for stabilizing a connection of tube segments according to an example embodiment.

FIG. 3 is a perspective view of a restraint system 300 for stabilizing tube segments. The restraint system 300 is configured to secure the tube segments' connection during catalyst loading through the tube segments. During the operation, the catalyst loading may cause a vertical force along the tube segments and lead to a detachment of the connection therebetween. The tube segments may be disconnected in such condition because a primary restraint on the connection of the tube segments is not strong enough to resist the vertical force. Here, the restraint system 300 is an independent restraint that secures the connection of the tube segments so that they will not disconnect during catalyst loading in the event the primary joint coupling 306 is damaged.

In an example embodiment, the restraint system 300 includes a first restraint 310 and a second restraint 320. The first restraint 310 and the second restraint 320 are fastened on a first tube segment 302 and a second tube segment 304, respectively. The first restraint 310 includes a first collar portion 312 and a second collar portion 314. Similarly, the second restraint 320 includes a third collar portion 322 and a fourth collar portion 324. In this example, the first tube segment 302 and the second tube segment 304 are connected by a joint coupling 306. The restraint system 300 further includes a first joining rod 332 and a second joining rod 334. As shown in FIG. 3, the first joining rod 332 and the second joining rod 334 each has a first end that couples to the first restraint 310. Similarly, the first joining rod 332 and the second joining rod 334 each has a second end that couples to the second restraint 320. Elements 332 and 334 can be more generally referred to as linkages. While joining rods 332 and 334 are illustrated as generally rigid members in FIGS. 3 and 4, it should be understood that these linkages can take a variety rigid, semi-rigid, and flexible forms that include but are not limited to chains and chokers.

In an example embodiment, the first restraint 310 including the first collar portion 312 and the second collar portion 314 are locked on the first tube segment 302 by a first fastener and a second fastener, respectively. Similarly, the second restraint 320 including the third collar portion 322 and the fourth collar portion 324 are respectively locked on the second tube segment 304 by a third fastener and a fourth fastener. The first, second, third, and fourth fasteners are not shown in FIG. 3 and will be further described in detail in connection with FIG. 4.

In an example embodiment, the first joining rod 332 couples to the first restraint 310 by passing its first end through first vertical holes of the first collar portion 312 and the second collar portion 314, at one side of the first tube segment 302. On the other side of the first tube segment 302, the second joining rod 334 couples to the first restraint 310 by passing its first end through second vertical holes of the first collar portion 312 and the second collar portion 314. Similarly, the first joining rod 332 couples to the second restraint 320 by passing its second end through first vertical holes of the third collar portion 322 and the fourth collar portion 324, at one side of the second tube segment 304. On the other side of the second tube segment 304, the second joining rod 334 couples to the second restraint 320 by passing its second end through second vertical holes of the third collar portion 322 and the fourth collar portion 324. In an example embodiment, the first joining rod 332 and the second joining rod 334 are made of materials including aluminum, cobalt, copper, nickel, and titanium. In an example embodiment, the first joining rod 332 and the second joining rod 334 have a same diameter of 0.75 inch. Further, the first joining rod 332 and the second joining rod 334 have a same nominal length of 20 inches.

In an example embodiment, the restraint system 300 includes a first coupling mechanism 316 and a second coupling mechanism 318 that are located at the first tube segment 302. The first coupling mechanism 316 passes through the first end of the first collar portion 312 and the first end of the first joining rod 332 to lock the first collar portion 312 with the first joining rod 332. Similarly, the second coupling mechanism 318 passes through the second end of the first collar portion 312 and the first end of the second joining rod 334 to lock the first collar portion 312 with the second joining rod 334. At the second tube segment 304, the restraint system 300 also includes a third coupling mechanism 326 and a fourth coupling mechanism 328. As shown in FIG. 3, the third coupling mechanism 326 passes through the first end of the fourth collar portion 324 and the second end of the first joining rod 332 to lock the fourth collar portion 324 with the first joining rod 332. Similarly, the fourth coupling mechanism 328 passes through the second end of the fourth collar portion 324 and the second end of the second joining rod 334 to lock the fourth collar portion 324 with the second joining rod 334.

In an example embodiment, the first, the second, the third, and the fourth coupling mechanisms are pins that are respectively inserted into corresponding collar portions and joining rods. In an example embodiment, the first, the second, the third, and the fourth coupling mechanisms are hitch pins with square wire retainers. For example, FIG. 3 shows that the first coupling mechanism 316 is a hitch pin inserted into the first collar portion 312 and the first joining rod 332. Specifically, this hitch pin has a square (but could also be circular or semi-circular) wire loop attached through the hitch pin head and secured over the opposite end. This hitch pin is easy to insert into and remove from the restraint system 300 and is configured for quick securing and removal without special tools. The hitch pin may be made of 1039 or 4140 steel and is zinc plated with a dichromate dip for corrosion resistance. This hitch pin can have any size in order to fit into structures described in the restraint system 300.

In an example embodiment, the first tube segment 302 and the second tube segment 304 are connected by a joint coupling 306. As shown in FIG. 3, the joint coupling 306 is formed at the connection of the first and second tube segments 302 and 304. In this example, the first and second tube segments are respectively connected with a male adapter and a female adapter. The male adapter is further inserted into the female adapter to connect the first tube segment 302 and the second tube segment 304. In an example embodiment, the tube segments connection with male and female adapters are further secured by a primary restraint, e.g., a clamp. The clamp may be a wingnut clamp or a hose clamp and is wide enough to cover both of the male and female adapters in order to tighten the connection therebetween.

The restraint system 300 is configured to secure the connection of the first tube segment 302 and the second tube segment 304. As described earlier, the first and second restraints 310 and 320 are fastened on the first tube segment 302 and the second tube segment 304, respectively. Further, the first and second joining rods 332 and 334 respectively couple to collar portions of the first restraint and collar portions of the second restraint. Specifically, the coupling mechanisms shown in FIG. 3 pass through and secure the interconnection of the first collar portion 312 and the first and second joining rods 332 and 334, and the fourth collar portion 324 and the first and second joining rods 332 and 334. Consequently, the connection of first and second tube segments 302 and 304 are secured by the first and second restraints 310 and 320 of the restraint system 300. In this example, the restraint system 300 works independently of the primary restraint applied on joint coupling 306 to secure the connection between the first and second tube segments 302 and 304. For example, the primary restraint may fail when there is an extreme amount of catalyst flow through the tube segments causing the joint coupling 306 to break. If the primary restraint fails, the restraint system 300 maintains secured attachments of the first and second restraints 310 and 320 on the first and second tube segments. Moreover, the coupling mechanisms and joining rods are rigid enough to endure a large vertical force occurring at the connection of the tube segments.

In an example embodiment, the first collar portion 312 and the fourth collar portion 324 are located equidistantly on corresponding tube segments from the joint coupling 306. Similarly, the second collar portion 314 and the third collar portion 322 are located equidistantly on corresponding tube segments from the joint coupling 306. In this example, the second and third collar portions 314 and 322 are respectively located closer to the joint coupling 306 as compared to the first and fourth collar portions 312 and 324. Further, the first and second collar portions 312 and 314 are in contact to each other on the first tube segment 302, and as are the third and fourth collar portions 322 and 324 on the second tube segment 304. As discussed earlier, the first and second restraints 310 and 320 are connected by joining rods 332 and 334 and coupling mechanisms that secure connections between the joining rods and the first and fourth collar portions 312 and 324. This configuration makes the restraint system 300 more durable because the vertical forces occurring at the connection of the tube segments are counteracted by both collar portions in each of the first and second restraints 310 and 320.

Figure 4:
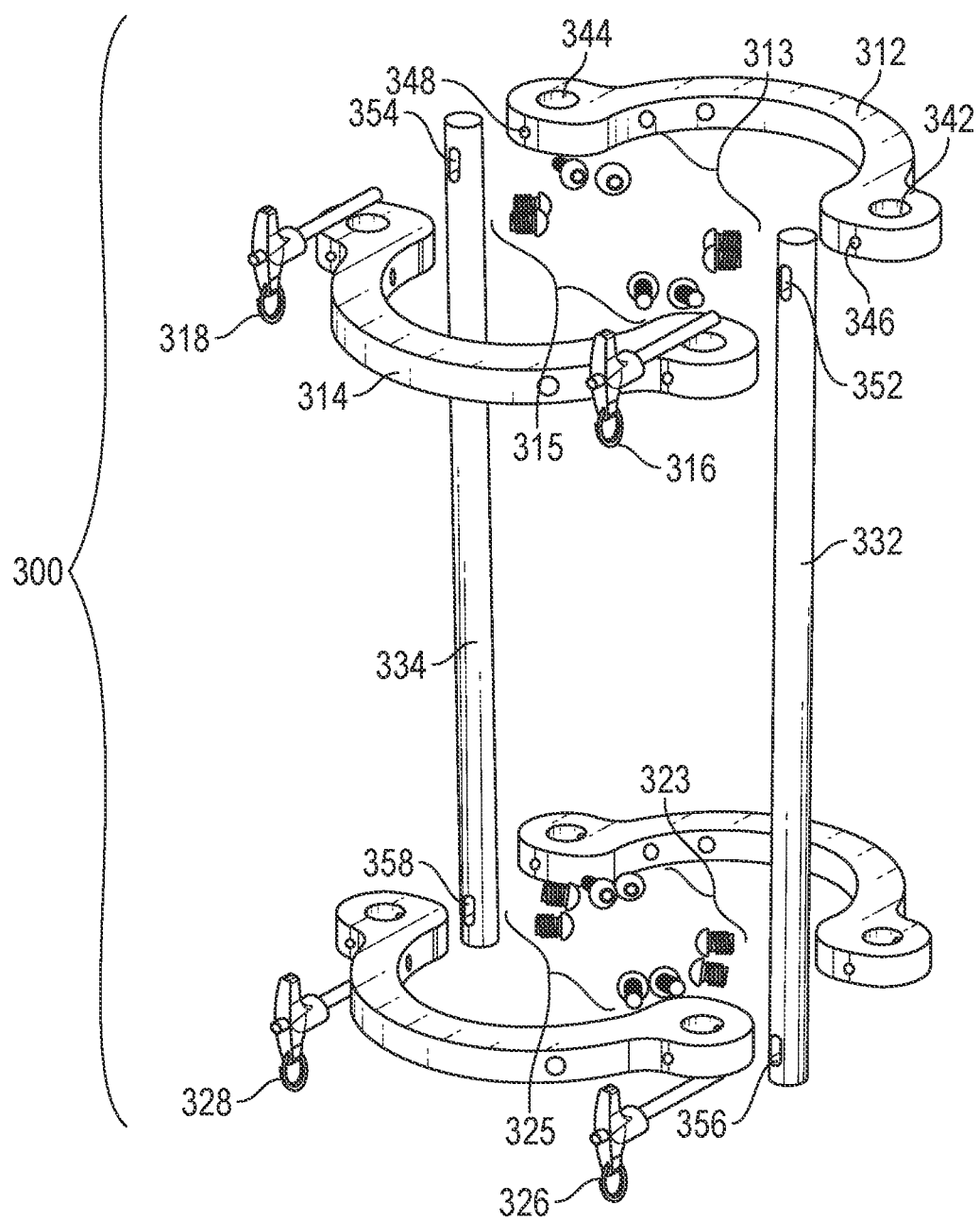
FIG. 4 is an exploded view of the restraint system of FIG. 3 according to an example embodiment.

FIG. 4 is an exploded view of the restraint system 300 of FIG. 3 according to an example embodiment. To minimize redundancy, not all features of the restraint system 300 discussed with respect to FIG. 3 are repeated below. As described above, the restraint system 300 includes the first and second fasteners that locked the first restraint 310 on the first tube segment 302 and the third and fourth fasteners that locked the second restraint 320 on the second tube segment 304. FIG. 4 illustrates detailed configuration and components included in the fasteners and corresponding collar portions.

In an example embodiment, the first fastener 313 includes a plurality of screws. Specifically, four screws are threaded from an interior of the first tube segment 302 into threaded holes of the first collar portion 312. The screws are tightened into the first collar portion 312 so that the first collar portion 312 is securely attached on the first tube segment 302. As shown in FIG. 4, two of the four screws are located close to the first end of the first collar portion 312 and another two of the four screws are located close to the second end of the first collar portion 312. Here, those four screws are located at a series of specific angles to the first and second ends of the first collar portion 312 so as to provide optimized moment arms in counteracting the vertical force generated on the connection of the tube segments.

In an example embodiment, the screws of the first fastener 313 are threaded into a portion of the threaded holes of the first collar portion 312. In this example, other attachments can be threaded into, from outside of the first collar portion 312, the remaining portion of the threaded holes of the first collar portion 312 for additional restraints or lanyards. In an example embodiment, the screws are tamper resistant screws with a round head. The rounded heads of the screws are in close contact with the interior wall of the first tube segment 302 when the screws are threaded into the first collar portion 312 and the rounded heads mitigate damage to the catalyst as it flows through the catalyst loading tube. In an example embodiment, the screws are made of steel and are coated with zinc and dichromate for resistance to corrosion caused by catalyst flow through the tube segments. In an example embodiment, the screws have a nominal threaded diameter of 0.375 inches, nominal length of 0.5 inches and a nominal head diameter ranging from 0.5 inches to 0.75 inches.

In an example embodiment, the second, third, and fourth fasteners 315, 323, and 325 also each includes a plurality of screws. Similar to that of the first fastener 313, each of the second, third, and fourth fasteners 315, 323, and 325 has four screws that are threaded from an interior of corresponding tube segment into through holes of corresponding collar portions. The location, size, and type of the screws of the second, third, and fourth fasteners 315, 323, and 325 are all similar to that of the first fastener 313. It should be understood that in alternate embodiments the first, second, third, and fourth fasteners can have other arrangements or components and can each consist of a single fastener.

In an example embodiment, the restraint system 300 includes vertical holes and lateral holes on each of the first, second, third, and fourth collar portions 312, 314, 322, and 324. Specifically, each one of the collar portions has two vertical holes respectively located on its first end and second end. In addition, each one of the collar portions has two lateral holes respectively located on its first end and second end. For example, the first collar portion 312 includes a first vertical hole 342 located on its first end and a second vertical hole 344 located on its second end. The first collar portion 312 also includes a first lateral hole 346 located on its first end and a second lateral hole 348 located on its second end. As shown in FIG. 4, the first and second lateral holes are perpendicular to the first and second vertical holes, respectively.

In an example embodiment, each of the first and second joining rods 332 and 334 includes a first and a second transverse holes. For example, the first joining rod 332 includes a first transverse hole 352 at the first end of the first joining rod 332 and a second transverse hole 356 at the second end of the first joining rod 332. Similarly, the second joining rod 334 includes a first transverse hole 354 at the first end of the second joining rod 334 and a second transverse hole 358 at the second end of the second joining rod 332. Here, the first transverse holes and the second transverse holes of the first and the second joining rods 332 and 334 have an oblong (or elongated) diameter along a longitudinal axis of the corresponding joining rods. In alternate embodiments, the first transverse holes and second transverse holes can have shapes other than oblong. Additionally, in alternate embodiments, the positions of the first and second transverse holes along the length of the respective first and second joining rods can be proximate to the ends of the joining rods or, as examples, within 1 to 2 inches of the respective ends of the joining rods.

In an example embodiment, the coupling mechanisms are quick release pins. For example, the first coupling mechanism 316 is a quick release pin with a pin shaft, a split ring at a head of the pin shaft, and a pair of spring loaded ball bearings projected out at the other end of the pin shaft. When the quick release pin is installed, the spring loaded ball bearings project out of the pin shaft, locking the first joining rod 332 with the first end of the first collar portion 312. Similar configurations may be applied on the second, third, and fourth coupling mechanisms 318, 326, and 328.

In an example embodiment, the first and second vertical holes of the first collar portion 312 are vertically aligned to the first and second vertical holes of the second collar portion 314. Similarly, the first and second vertical holes of the third collar portion 322 are vertically aligned to the first and second vertical holes of the fourth collar portion 324. In this example, the inside diameter of the first and second collar portions are equal to an outside diameter of the first tube segment 302. The first and second vertical holes of the first and second collar portions are all located on a common line that is colinear with a diameter of the first tube segment 302 when the first and second collar portions are installed thereon. Further, the inside diameter of the third and fourth collar portions are equal to an outside diameter of the second tube segment 304. The first and second vertical holes of the third and fourth collar portions are all located on a common line that is colinear with a diameter of the second tube segment 304 when the third and fourth collar portions are installed thereon.

As shown in FIG. 4, the first end of the first joining rod 332 passes through first vertical holes of the first collar portion 312 and the second collar portion 314. Additionally, the first transverse hole 352 is horizontally aligned with the first lateral hole 346 of the first collar portion 312. That way, the first coupling mechanism 316 can be inserted into the first joining rod 332 and the first collar portion 312 through the first transverse hole 352 and the first lateral hole 346. Similarly, the first end of the second joining rod 334 passes through second vertical holes of the first collar portion 312 and the second collar portion 314. Additionally, the first transverse hole 354 of the second joining rod 334 is horizontally aligned with the second lateral hole 348 of the first collar portion 312. This configuration enables the second coupling mechanism 318 to be inserted into the second joining rod 334 and the first collar portion 312 through the first transverse hole 354 and the second lateral hole 348. Similar configurations and interconnections exist among the collar portions of the second restraint 320, the first and second joining rods, and the third and fourth coupling mechanisms.

In an example embodiment, the first joining rod 332 and the second joining rod 334 have a same diameter of 0.75 inches. The vertical holes of the first, second, third, and fourth collar portions have a same diameter that is equal to or larger than the diameter of the joining rods and that ranges from 0.1 inch to 1.5 inch. Additionally, the lateral holes of the first, second, third, and fourth collar portions have a diameter smaller than that of the vertical holes and in a range from 0.1 inch to 0.5 inch. Further, as reference previously, the transverse holes of the first and second joining rods have an oblong, or elongated, diameter along a longitudinal axis of the first and second joining rods. The short diameter of the transverse holes of the first and second joining rods is equal to or larger than the lateral holes of the corresponding collar portions.

Figure 5:
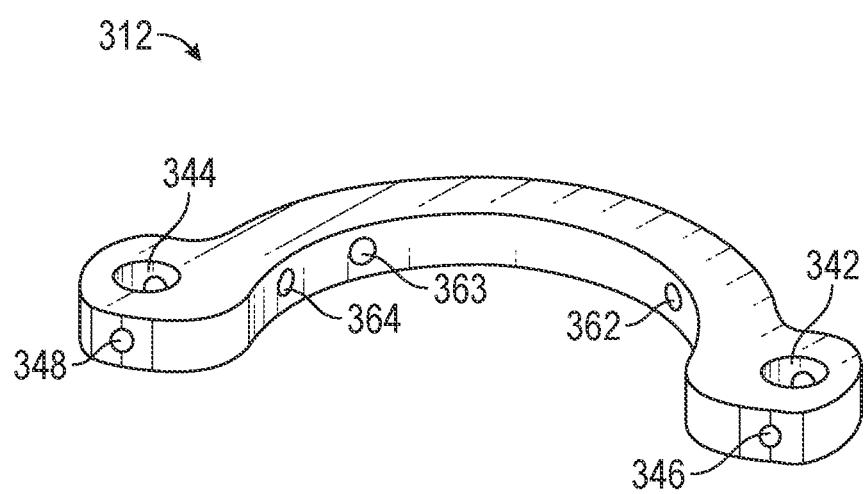
FIG. 5 is a perspective view of the first collar portion of the restraint system of FIG. 3 according to an example embodiment.

FIG. 5 shows a perspective view of the first collar portion 312 of the restraint system 300 described in FIG. 3. In an example embodiment, the first collar portion 312 is in a half circle shape and has protruding portions extending out of its first and second ends. The first and second vertical holes 342 and 344 are located at a center of the protruding portions, respectively. In addition, the first and second vertical holes 342 and 344 are horizontally aligned on a diameter of the first collar portion 312. In an example embodiment, the first collar portion 312 includes a plurality of threaded holes corresponding to the plurality of screws threaded therein.

The number of the threaded holes and their locations on the collar portion 312 are specifically designed to minimize bending stresses on the collar portions by providing small moment arms for counteracting the vertical force generated on the connection of the first and second tube segment. In an example embodiment, when the first tube segment 302 has an outside diameter of 4 inches, the first collar portion 312 includes four threaded holes 362, 363, and 364 tone hole not visible in FIG. 5) and four corresponding screws of the first fastener 313. The four through holes are located at angles of 25°, 50°, 130°, and 155° from the first end of the first collar portion 312, respectively. In an example embodiment, when the first tube segment 302 has an outside diameter of 6 inches, the first collar portion 312 includes four through holes 362, 363 and 364 tone hole not visible in FIG. 5) and four corresponding screws of the first fastener 313. In this example, the four through holes are located at angles of 20°, 45°, 135°, and 160° from the first end of the first collar portion 312, respectively. It has been found that a collar portion with a larger inside diameter has shifted peak stresses locations. Therefore, for example, in the case of the collar portion for the tube segment with a 6 inch outer diameter, all of the threaded holes are each respectively located closer to their ends of the first collar portion 312 as compared to the collar portion for the tube segment with a 4 inch outer diameter. This configuration provides a smaller moment arm for securing the tube segments through the collar portions attached thereon and for counteracting a larger vertical force generated at connection of larger size tube segments.

Figure 6:
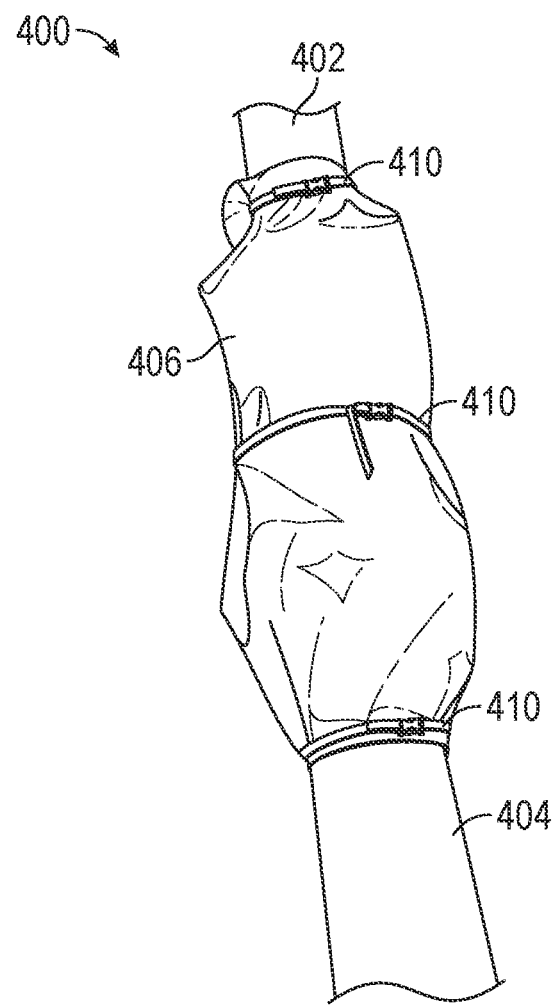
FIG. 6 shows a restraint system with a cover for stabilizing a connection of tube segments according to another example embodiment.

FIG. 6 shows a restraint system 400 with a cover 406 for stabilizing a connection of tube segments according to another example embodiment. The restraint system 400 includes a cover 406 and several straps 410. In this example, this restraint system 400 is partially configured to isolate the tube segments connection from the surrounding environment during catalyst loading. Similar to the primary restraints described in FIGS. 1-3, the restraint system 400 includes a joint coupling at the connection of the tube segments 402 and 404. The joint coupling may be coupled by a clamp to secure the connection between the tube segments 402 and 404.

As shown in FIG. 6, the cover 406 is wrapped around the connection of the tube segments 402 and 404. The cover encompasses the connection portion of the tube segments including the joint coupling and clamp attached thereon. The cover 406 is tightened on the tube segments by a group of straps 410. In this example, three straps have been implemented to tighten a top, a middle and a bottom portion of the cover 406 on the tube segment 402, the connection, and the tube segment 404, respectively. This cover 406 helps prevent unintentional impact or entangling of surrounding equipment with the connection of the tube segments and the restraint system during catalyst loading from a hopper to a reactor vessel. In an example embodiment, the cover 406 is a canvas made of durable materials including cotton, fiber, and linen. In an example embodiment, the cover 406 has a rectangular shape with a height ranging from 24 inches to 36 inches, and a width ranging from 36 inches to 54 inches, before the installation. In an example embodiment, the connection of tube segments 402 and 404 is also secured by a restraint system 300 as shown in FIG. 3, which is located under the cover 406 in FIG. 6. In this example, the cover 406 is wrapped around all of the joint coupling, the clamp and the restraint system 300.

Figure 7:
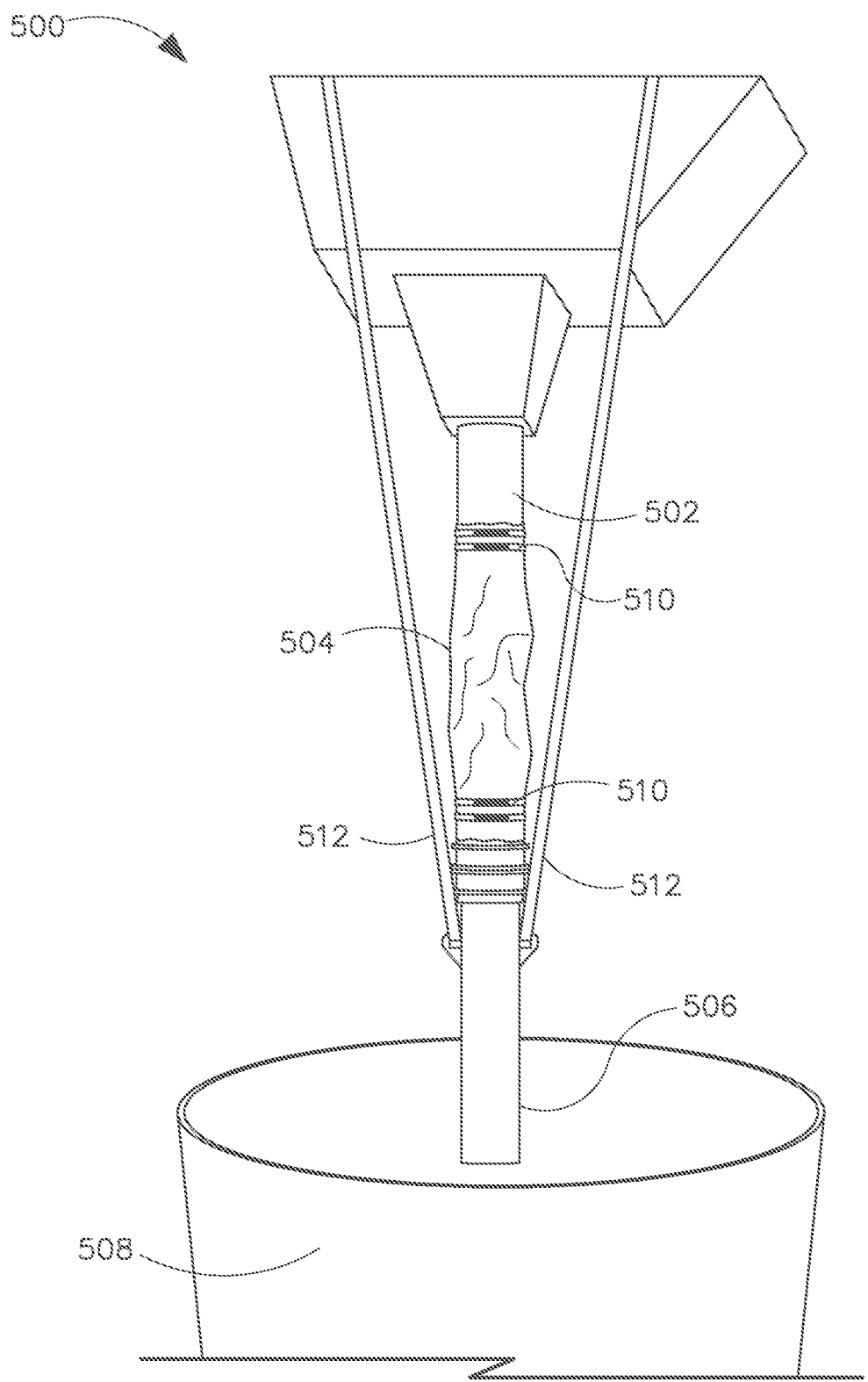
FIG. 7 shows a restraint system for securing a connection of tube segments for catalyst loading according to another example embodiment.

FIG. 7 illustrates an example of a restraint system 500 for securing a connection of tube segments for catalyst loading from a hopper to the reactor vessel according to another example embodiment. Similar to the operations described in FIG. 1, catalysts are output from the hopper outlet 502 after prescreening therein. The reactor vessel 508 is located on the ground and below the hopper outlet 502. As shown in FIG. 7, the reactor vessel 508 has a catalyst loading tube 506 extending above the reactor vessel and being secured by chokers 512 that connect the catalyst loading tube 506 to the hopper above. During operation, a worker may manually connect the hopper outlet 502 to the catalyst loading tube 506 for uniform loading of catalyst into a catalyst bed within the reactor vessel 508. The white tubes extending above the reactor vessel 508, as shown in FIG. 7, are PVC tubes covering manway studs to prevent damage to the threads. There is also corrugated black tube configured for ventilation.

In an example embodiment, a restraint system such as the one illustrated in FIGS. 3-5, can be used to securely join tube segments of the catalyst loading tube 506. Additionally, such a restraint system can be used to secure the catalyst loading tube 506 to hopper outlet 502. In the example illustrated in FIG. 7, the chokers 512 support the load of the catalyst loading tube 506, but cover 504 joins the catalyst loading tube 506 with the hopper outlet 502. The cover 504 is wrapped around to form a through path and has two ends clamped on the hopper outlet 502 and one of the catalyst loading tubes 506, respectively. To secure the connection between the hopper outlet 502 and the catalyst loading tube 506, each end of the cover 504 is clamped by two hose clamps 510. In an example embodiment, the wrapped cover 504 is sealed to form a closed through path between the hopper outlet 502 and the reactor vessel 508.

Figure 8:
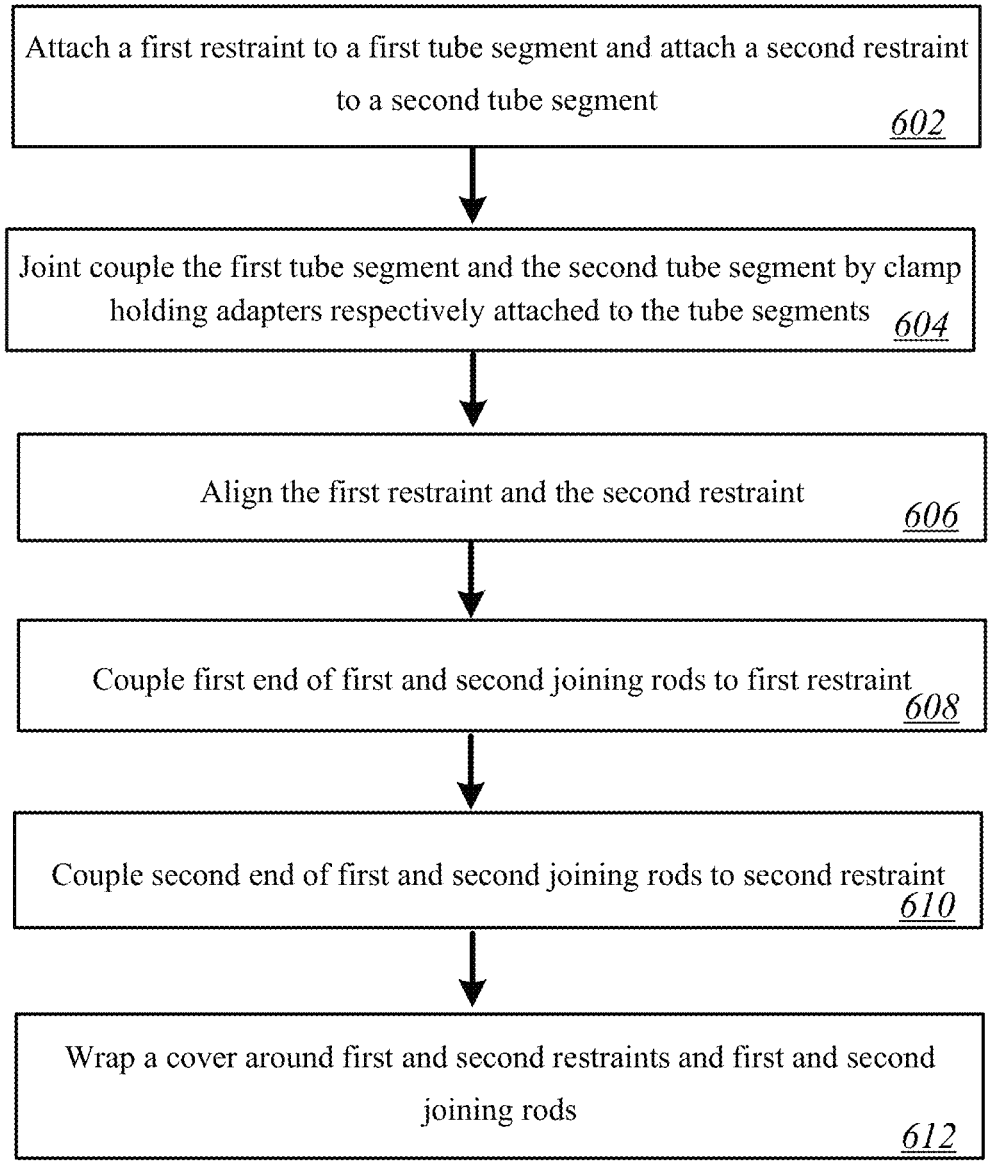
FIG. 8 illustrates a method for stabilizing a connection of tube segments by the restraint system according to an example embodiment.

FIG. 8 illustrates a method 600 for stabilizing a connection of tube segments by the restraint system 300 according to an example embodiment. Referring to FIGS. 3 and 6, in an example embodiment, the method 600 includes attaching a first restraint having a first collar portion and a second collar portion to a first tube segment by a first and a second fasteners, respectively; and attaching a second restraint having a third collar portion and a fourth collar portion to a second tube segment by a third and a fourth fasteners, respectively, at 602. For example, the first restraint 310 and the second restraint 320 can be attached on the first tube segment 302 and the second tube segment 304 by the first and second fasteners 313 and 315 and the third and fourth fasteners 323 and 325, respectively. Typically, the restraints are attached to the tube segments one time and are not removed and reattached in the field. The method 600 also includes joint coupling the first tube segment and the second tube segment with a clamp and adapters respectively attached to the tube segments, at 604. For example, the first tube segment 302 and the second tube segment 304 are jointly coupled by a male and a female adapters to connect the first and second tube segments. The male and female adapters are each attached to the tube segments 302 and 304, and a clamp is configured to hold the male and female adapters together. The method 600 also includes aligning the first restraint and the second restraint, at 606. For example, once the first and second tube segments are jointly coupled, the first restraint 310 and the second restraint 320 can be aligned by aligning first vertical holes of the first restraint 310 and the first vertical holes of the second restraint 320.

Further, the method 600 includes coupling a first end of a first joining rod and a first end of a second joining rod to the first restraint, at 608. For example, the first joining rod 332 and the second joining rod 334 respectively pass through first vertical holes and second vertical holes of the first restraint 310. The first coupling mechanism 316 is inserted into first end of the first joining rod 332 and the first end of the first collar portion 312. The second coupling mechanism 318 is inserted into first end of the second joining rod 334 and the second end of the first collar portion 312. Moreover, the method 600 includes coupling a second end of a first joining rod and a second end of a second joining rod to the second restraint, at 610. For example, the first joining rod 332 and the second joining rod 334 respectively pass through first vertical holes and second vertical holes of the second restraint 320. The third coupling mechanism 326 is inserted into the second end of the first joining rod 332 and the first end of the fourth collar portion 324. The fourth coupling mechanism 328 is inserted into the second end of the second joining rod 334 and the second end of the fourth collar portion 324. Lastly, the method 600 includes wrapping a cover around the first and second restraints and the first and second joining rods, at 612. For example, a cover 406 is used to wrap around the first restraint 310 and the second restraint 320, and the first and second joining rods 332 and 334. In addition, the cover 406 is secured in place by tightening the straps 410 thereon.

In an example embodiment, the joint coupling of the method 600 is formed at a connection of the first and second tube segments. For example, the joint coupling 306 is formed at the connection of the first tube segment 302 and the second tube segment 304 as shown in FIG. 3. In this example, a primary restraint, e.g., a clamp, is attached on the joint coupling 306 to secure the connection of the first and second tube segments 302 and 304. Further, the first restraint 310 and the second restraint 320 work independently of the primary restraint and are configured to secure the connection of the first and second tube segments when the primary restraint malfunctions.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

Referring generally to the examples herein, any components of the system (e.g., the collar portions, the joining rods), described herein can be made from a single piece (e.g., as from a mold, injection mold, die cast, 3-D printing process, water jet, CNC machined, extrusion process, stamping process, or other prototype methods). In addition, or in the alternative, a component of the system can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Terms such as "first", "second", "third", "fourth", "top", "bottom", "side", and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A restraint system, comprising:
    a first restraint having a first collar portion and a second collar portion;
    a first fastener configured to attach the first collar portion to a first tube segment, wherein the first fastener is threaded from an interior of the first tube segment into a through hole in the first collar portion;
    a second fastener configured to attach the second collar portion to the first tube segment, wherein the second fastener is threaded from an interior of the first tube segment into a through hole in the second collar portion;
    a first linkage having a first end and a second end, wherein the first end of the first linkage couples to the first restraint;
    a second linkage having a first end and a second end, wherein the first end of the second linkage couples to the first restraint;
    a second restraint having a third collar portion and a fourth collar portion;
    a third fastener configured to attach the third collar portion to a second tube segment, wherein the third fastener is threaded from an interior of the second tube segment into a through hole in the third collar portion; and a fourth fastener configured to attach the fourth collar portion to the second tube segment, wherein the fourth fastener is threaded from an interior of the second tube segment into a through hole in the fourth collar portion, wherein the second end of the first linkage and the second end of the second linkage couple to the second restraint.

2. The restraint system of claim 1, further comprising:

a first coupling mechanism that passes through a first end of the first collar portion and the first end of the first linkage, wherein the first end of the first linkage passes through the first end of the first collar portion and a first end of the second collar portion;

a second coupling mechanism that passes through a second end of the first collar portion and the first end of the second linkage, wherein the first end of the second linkage passes through the second end of the first collar portion and a second end of the second collar portion;

a third coupling mechanism that passes through a first end of the fourth collar portion and the second end of the first linkage, wherein the second end of the first linkage passes through a first end of the third collar portion and the first end of the fourth collar portion; and a fourth coupling mechanism that passes through a second end of the fourth collar portion and the second end of the second linkage, wherein the second end of the second linkage passes through a second end of the third collar portion and the second end of the fourth collar portion.

3. The restraint system of claim 2, wherein the first end of the first linkage passes through a first vertical hole of the first collar portion and a first vertical hole of the second collar portion, and the first end of the second linkage passes through a second vertical hole of the first collar portion and a second vertical hole of the second collar portion, and wherein the second end of the first linkage passes through a first vertical hole of the third collar portion and a first vertical hole of the fourth collar portion, and the second end of the second linkage passes through a second vertical hole of the third collar portion and a second vertical hole of the fourth collar portion.

4. The restraint system of claim 2, wherein the first coupling mechanism is a first pin that is inserted into the first end of the first collar portion and the first end of the first linkage, wherein the second coupling mechanism is a second pin that is inserted into the second end of the first collar portion and the first end of the second linkage, wherein the third coupling mechanism is a third pin that is inserted into the first end of the fourth collar portion and the second end of the first linkage, and wherein the fourth coupling mechanism is a fourth pin that is inserted into the second end of the fourth collar portion and the second end of the second linkage.

5. The restraint system of claim 2, wherein the first coupling mechanism is inserted through a first lateral hole on the first end of the first collar portion and a first transverse hole of the first linkage, wherein the second coupling mechanism is inserted through a second lateral hole on the second end of the first collar portion and a first transverse hole of the second linkage, wherein the third coupling mechanism is inserted through a first lateral hole on the first end of the fourth collar portion and a second transverse hole of the first linkage, and wherein the fourth coupling mechanism is inserted through a second lateral hole on the second end of the fourth collar portion and a second transverse hole of the second linkage.

6. The restraint system of claim 5, wherein the first transverse holes and the second transverse holes of the first and the second linkages have an oblong diameter along a longitudinal axis of the first and second linkages.

7. The restraint system of claim 2, wherein the first, the second, the third, and the fourth coupling mechanisms are hitch pins with retainers, wherein the retainers are spring-loaded or wire retainers, and wherein the wire retainers have a cross-section having one of square, circular, or semi-circular shape.

8. The restraint system of claim 1, wherein a joint coupling is formed at a connection of the first tube segment and the second tube segment, and wherein a separate additional restraint is attached on the joint coupling to secure the connection of the first tube segment and the second tube segment.

9. The restraint system of claim 8, wherein the restraint system works independently of the separate additional restraint, and wherein the restraint system is configured to secure the connection of the first tube segment and the second tube segment when the separate additional restraint malfunctions.

10. The restraint system of claim 9, wherein the first and the fourth collar portions are equidistant from the joint coupling and the second and the third collar portions are equidistant from the joint coupling.

11. The restraint system of claim 1, wherein an inside diameter of the first collar portion and the second collar portion is equal to an outside diameter of the first tube segment, and wherein an inside diameter of the third collar portion and the fourth collar portion is equal to an outside diameter of the second tube segment.

12. The restraint system of claim 1, wherein the first fastener includes a first group of screws that are threaded from an interior of the first tube segment into the first collar portion, wherein the second fastener includes a second group of screws that are threaded from the interior of the first tube segment into the second collar portion, wherein the third fastener includes a third group of screws that are threaded from an interior of the second tube segment into the third collar portion, and wherein the fourth fastener includes a fourth group of screws that are threaded from the interior of the second tube segment into the fourth collar portion.

13. The restraint system of claim 12, wherein, the through hole of each of the first, the second, the third, or the fourth collar portion is one of a plurality of through holes that receive the first group of screws, the second group of screws, the third group of screws, and the fourth group of screws.

14. The restraint system of claim 1, wherein the first, the second, the third, and the fourth collar portions are identical to each other.

15. A method, comprising:

attaching a first restraint having at least one first collar portion to a first tube segment by a first and a second fasteners, respectively, and attaching a second restraint having a at least one second collar portion to a second tube segment by a third and a fourth fasteners, respectively;
joint coupling the first tube segment and the second tube segment;
aligning the first restraint and the second restraint;
passing a first end of a first linkage through a first end of the at least one first collar portion;
passing a first end of a second linkage through a second end of the at least one first collar portion;
passing a second end of the first linkage through a first end of the at least one second collar portion; and
passing a second end of the second linkage through a second end of the at least one second collar portion.

16. The method of claim 15, further comprising wrapping a cover around the first and second restraints and the first and second linkages.

17. The method of claim 15, wherein the coupling steps further comprise: inserting a first pin into the first end of the at least one first collar portion and the first end of the first linkage,
inserting a second pin into the second end of the at least one first collar portion and the first end of the second linkage,
inserting a third pin into the first end of the at least one second collar portion and the second end of the first linkage, and
inserting a fourth pin into the second end of the at least one second collar portion and the second end of the second linkage.

18. A restraint system, comprising:
a first restraint having a first collar portion and a second collar portion;
a first fastener configured to attach the first collar portion to a first tube segment;
a first linkage having a first end and a second end, wherein the first end of the first linkage couples to a first end of the first collar portion and a first end of the second collar portion;
a second linkage having a first end and a second end, wherein the first end of the second linkage couples to a second end of the first collar portion and a second end of the second collar portion;
a second restraint having a third collar portion and a fourth collar portion;
a second fastener configured to attach the third collar portion to a second tube segment;
wherein the second end of the first linkage couples to a first end of the third collar portion and a first end of the fourth collar portion; and
wherein the second end of the second linkage couples to a second end of the third collar portion and a second end of the fourth collar portion.

\* \* \* \* \*